June 20, 1944.   F. H. PETERSON   2,351,702
MACHINE FOR INSPECTING AND SORTING TRANSLUCENT MOLDED
PLASTIC BUTTONS AND THE LIKE
Filed July 11, 1941   5 Sheets-Sheet 1
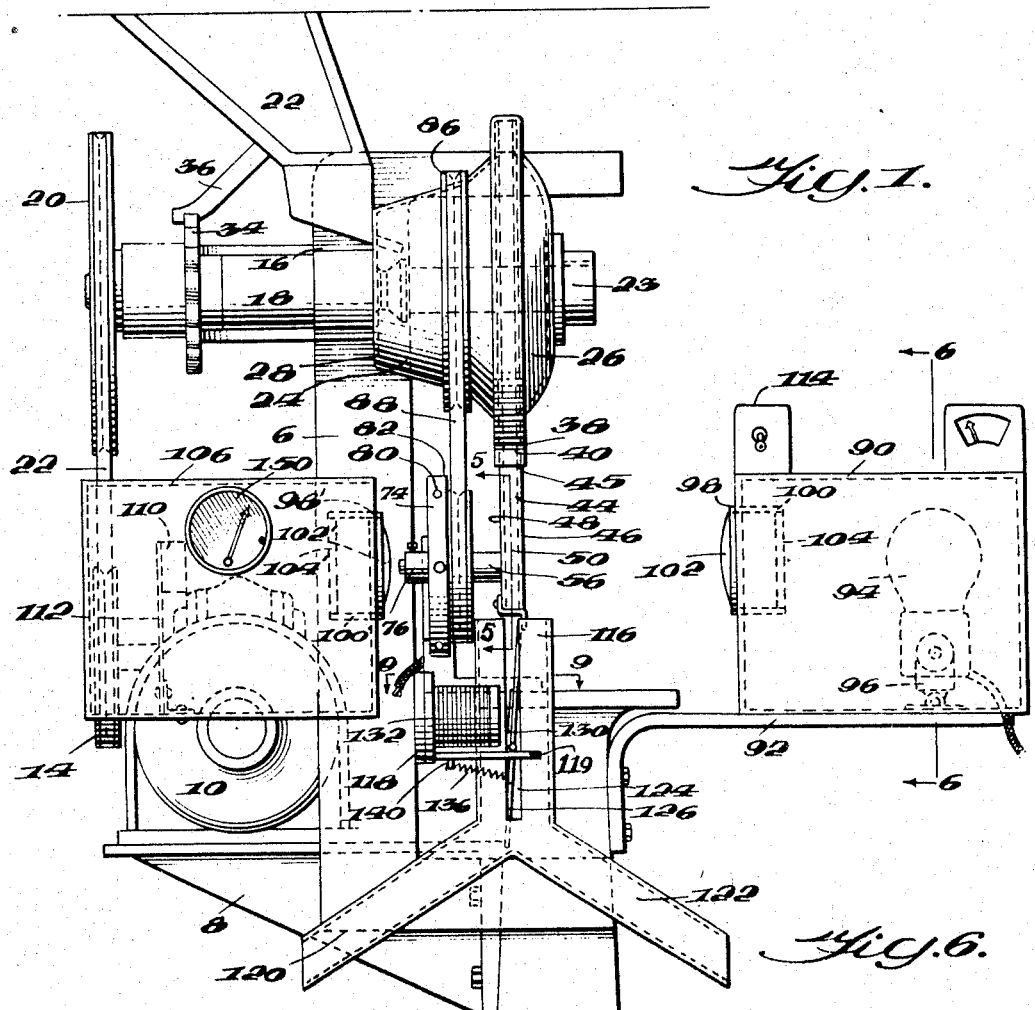
Inventor
FREDERICK H. PETERSON,
By Robert B Pearson
Attorney

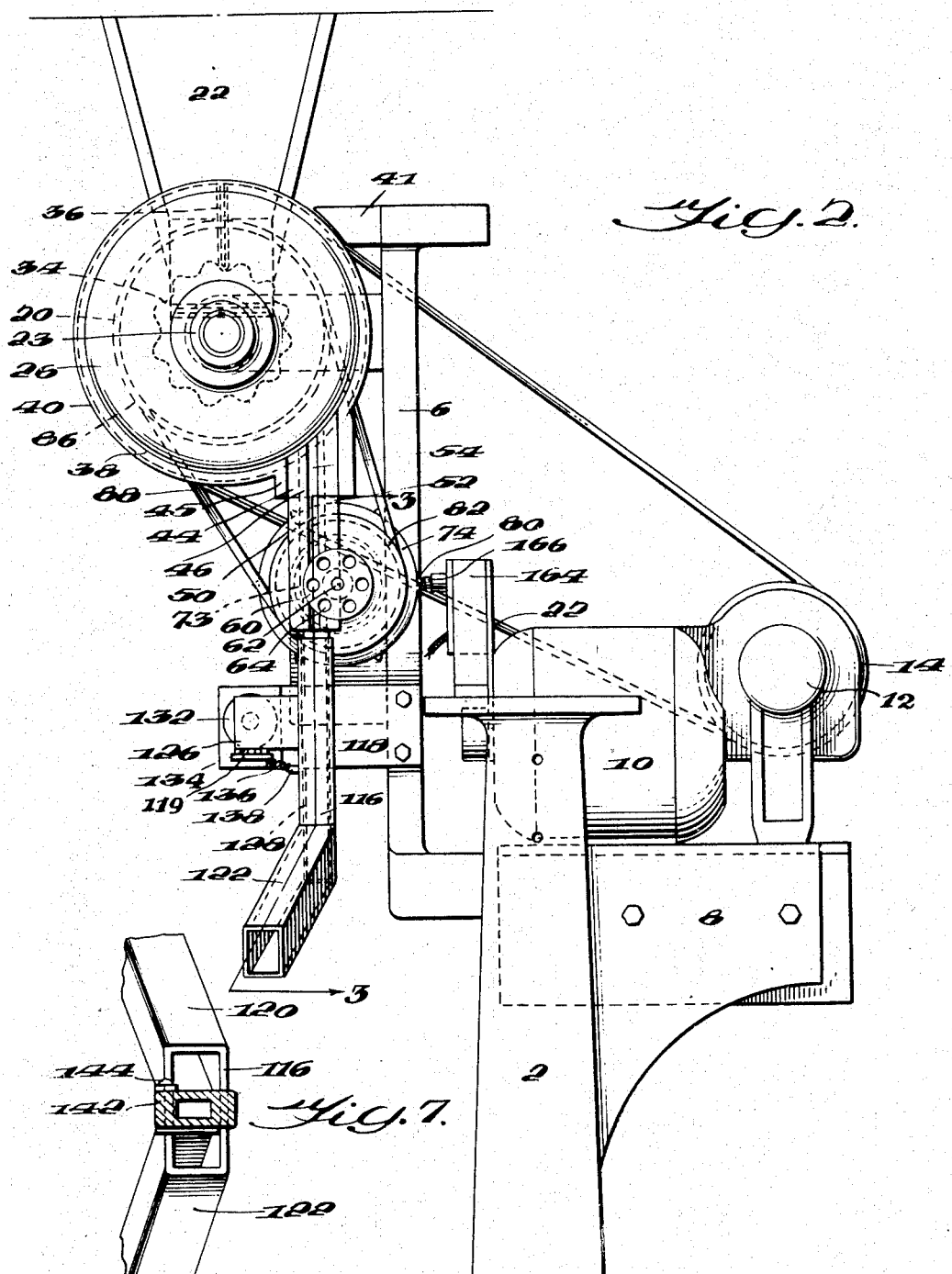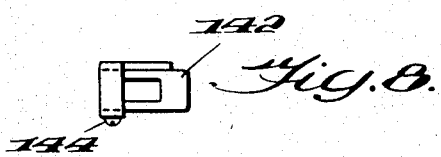

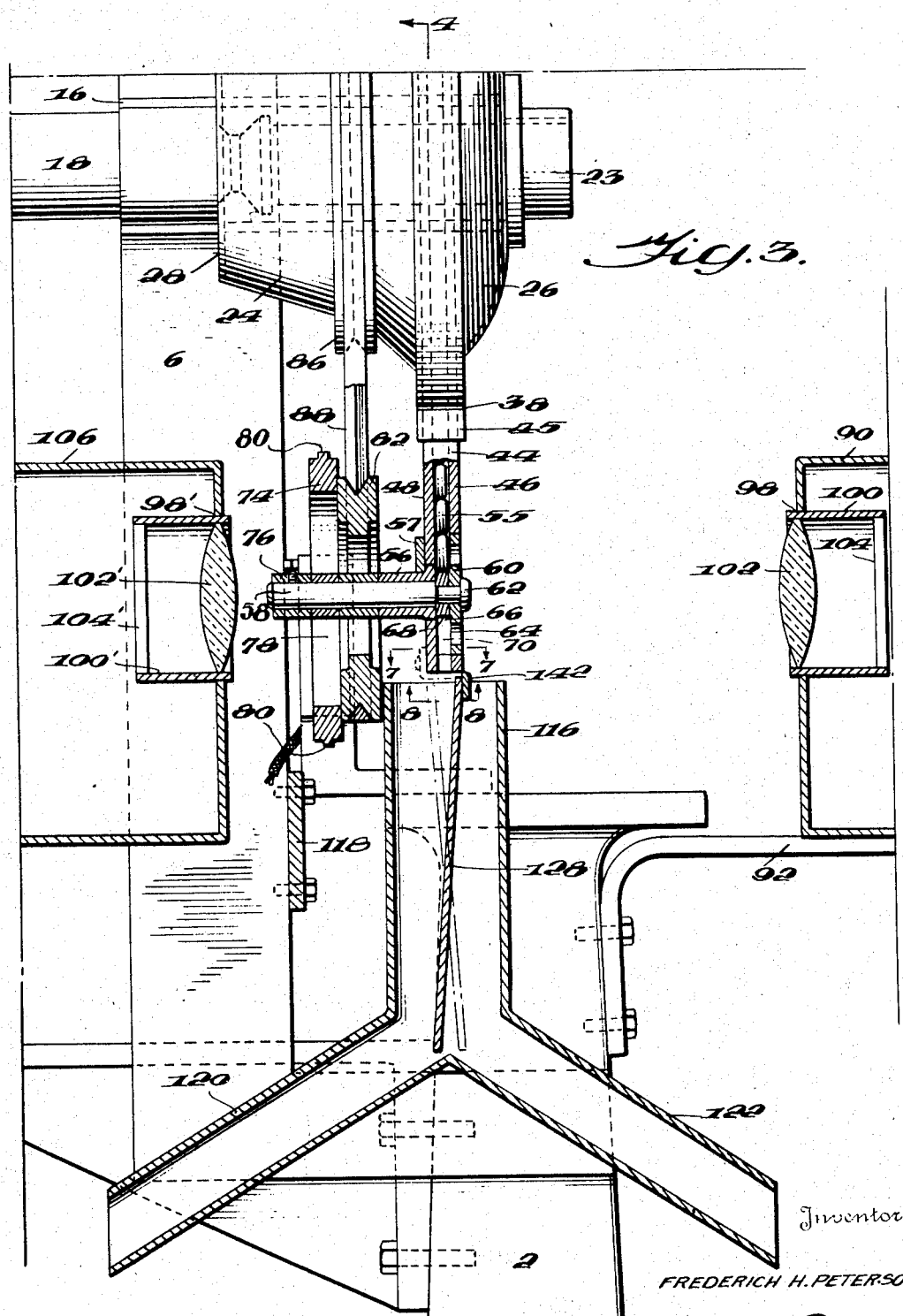

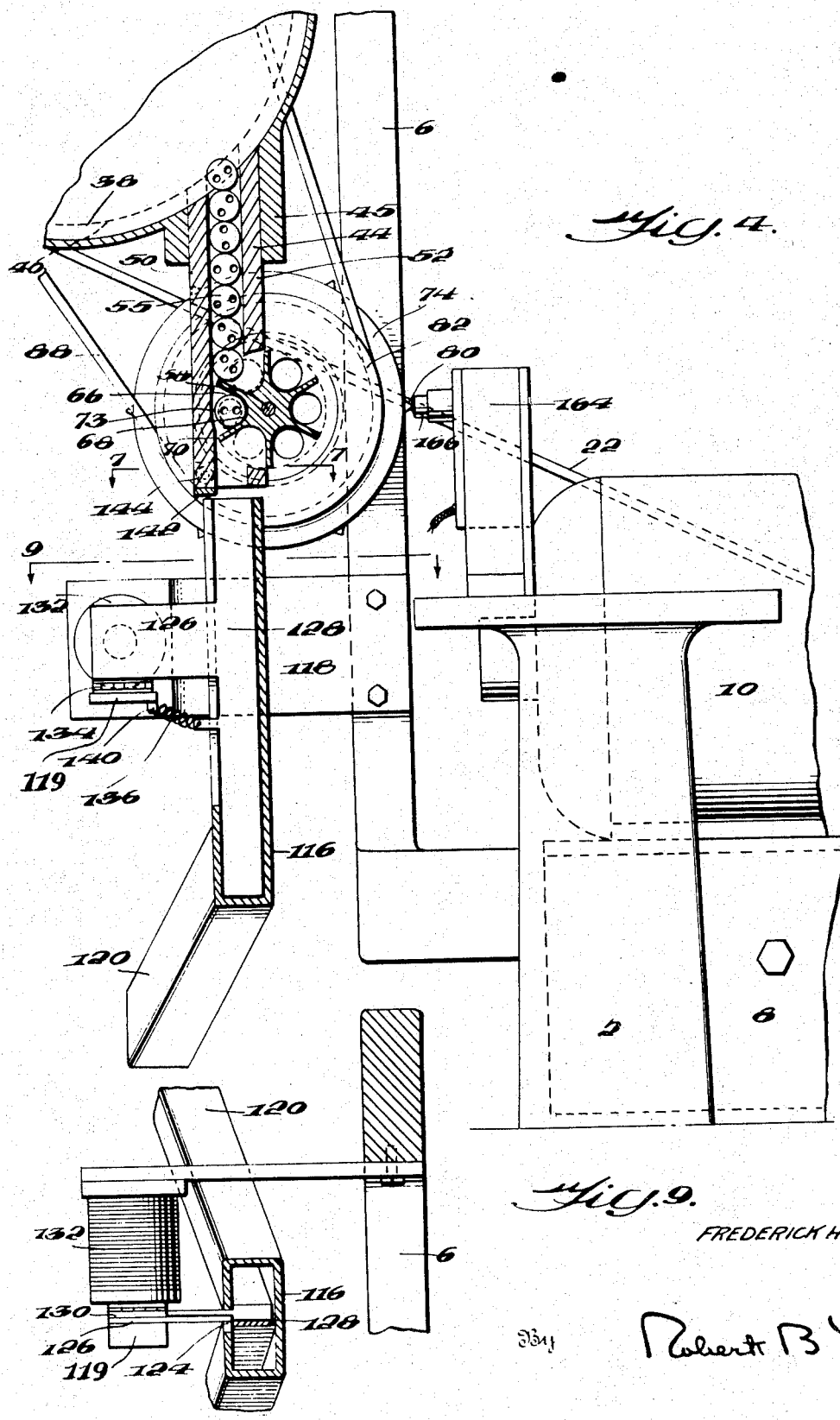

June 20, 1944.　　　　F. H. PETERSON　　　　2,351,702
MACHINE FOR INSPECTING AND SORTING TRANSLUCENT MOLDED
PLASTIC BUTTONS AND THE LIKE
Filed July 11, 1941　　　5 Sheets-Sheet 5

Inventor
FREDERICK H. PETERSON,
By Robert B. Pearson
Attorney

Patented June 20, 1944

2,351,702

UNITED STATES PATENT OFFICE 2,351,702

MACHINE FOR INSPECTING AND SORTING TRANSLUCENT MOLDED PLASTIC BUTTONS AND THE LIKE

Frederick H. Peterson, Watertown, Conn., assignor to The Patent Button Company, Waterbury, Conn.

Application July 11, 1941, Serial No. 402,027

5 Claims. (Cl. 209—111)

This invention relates to an automatic button inspecting and sorting machine and especially, although not exclusively, an apparatus for handling plastic molded buttons.

In molding plastic buttons, powdery blanks are compressed and heated between upper and lower halves of a mold having mating recesses complementary, in shape, to the buttons and having prong-like projections which form the eyes. Since the prongs in the upper and lower molds do not quite meet, a thin web of flash, varying in thickness from .002 to .07 of an inch is left across the centers of the eyes, this web ordinarily being removed by tumbling. Occasionally, however, some flash remains in the finished buttons so that the eyes are blocked or partially closed. Furthermore, it sometimes happens that one of the halves of the mold becomes slightly tilted so that the button eyes are slightly oval.

Heretofore, buttons were sorted by inspectors sitting alongside a conveyor belt picking out an occasional bad button from the thousands passing by. However, with the advent of buttons molded from highly translucent and substantially clear plastics, it became virtually humanly impossible to detect the microscopically thin webs of flash, or to judge slightly ovate eyes. It is therefore an object of this invention to provide an automatic inspecting and sorting machine embodying photoelectric means for detecting even the slightest imperfection in button eyes.

A further object is to provide a continuous, indefatigable method and means for inspecting translucent moldings wherein the moldings are moved rapidly and continuously from a hopper to appropriate containers without any appreciable pause or hesitation during the the inspection. More specifically, it is herein proposed to provide a light source continuously projecting light rays towards a photoelectric cell, a button-feed mechanism continuously feeding buttons to a scanning disk which carries the buttons at a pre-determined rate across the path of projected light, and an electrically operated button-sorting mechanism controlled in accordance with the amount of light transmitted through the button to the photoelectric cell, so that if a button, because of any imperfection in the eyes, transmits less light than would be transmitted by a perfect button, it will be rejected by the sorting mechanism.

Another object is to provide, in combination, a photoelectric scanning mechanism which allows light to pass from a light source to a photoelectric cell only while a button or other translucent molding is interposed therebetween, a sorting mechanism normally held in one sorting position, control means for moving the sorting mechanism to another sorting position, and means for operating the control means only during scanning of the button. Specifically, it is intended to provide a sorting plate, hereinafter called a flipper, normally held in one position in the path of the buttons as they drop from a scanning disk to deflect bad buttons, hereinafter called rejects, into one chute, the flipper being movable to another position to deflect good buttons, called perfects, to another chute only when sufficient light is transmitted by the button being inspected. The purpose of this arrangement is to avoid chattering of the flipper as the light rays are periodically blocked by the scanning disk and associated mechanisms between inspections. Corollary objects are to provide means for blocking the light rays between inspections, and means for disabling the sorting mechanism while the light rays are blocked between inspections and partially blocked by imperfect buttons during inspections.

Since there is a momentary interval required for a button to drop from the scanning disk to the flipper, it is an object to provide time delay means in the circuit controlling the flipper so that the flipper always operates at a predetermined lag behind inspection.

Still another object is to provide a timing mechanism on the scanning assembly for energizing the control circuit for the flipper only during inspection of the buttons so that if buttons jam the scanning disk and prevent movement thereof, the control circuit cannot become out of phase with the scanning disk. Additionally, it is intended to provide a slip-drive for the scanning disk and timing assembly so that a jammed button will neither become broken nor will it wreck the assembly.

Yet again, in the sorting mechanism, a further proposal is to provide a flipper mechanism requiring only extremely short movement between the positions in which it accepts and rejects the buttons, thereby leaving the potential operating speed of the machine almost unlimited.

Along with other objectives, such as the provision of means for ready access to buttons at any stage to clear jams, control means for focusing the light and for altering the criterion and sensitivity of the selection, and indicators by which the criterion and sensitivity can be pre-set, it is an object to form the mechanism of a few relatively moving parts, the operation and construction of which will be apparent from the following specification and drawings, in which:

Figure 1 is a side elevation of the assembly;

Figure 2 is a front elevation, with a lamp box removed;

Figure 3 is a vertical section on an enlarged scale taken approximately along the lines 3—3 of Figure 2, looking in the direction of the arrows, the rotating parts being shown in axial section;

Figure 4 is an enlarged vertical section along the lines 4—4 of Figure 3, looking in the direction of the arrows;

Figure 5 is an enlarged detailed sectional view along the lines 5—5 of Figure 1, looking in the direction of the arrows;

Figure 6 is a detail sectional view along lines 6—6 of Figure 1, showing the light source mounting;

Figure 7 is a horizontal section along the lines 7—7 of Figure 3 looking downwardly;

Figure 8 is a detail view of the flipper stop element, looking upwardly in the direction of the arrows 8—8 in Figure 3;

Figure 9 is a horizontal section along the lines 9—9 in Figure 4 looking downwardly in the direction of the arrows.

Figure 10:
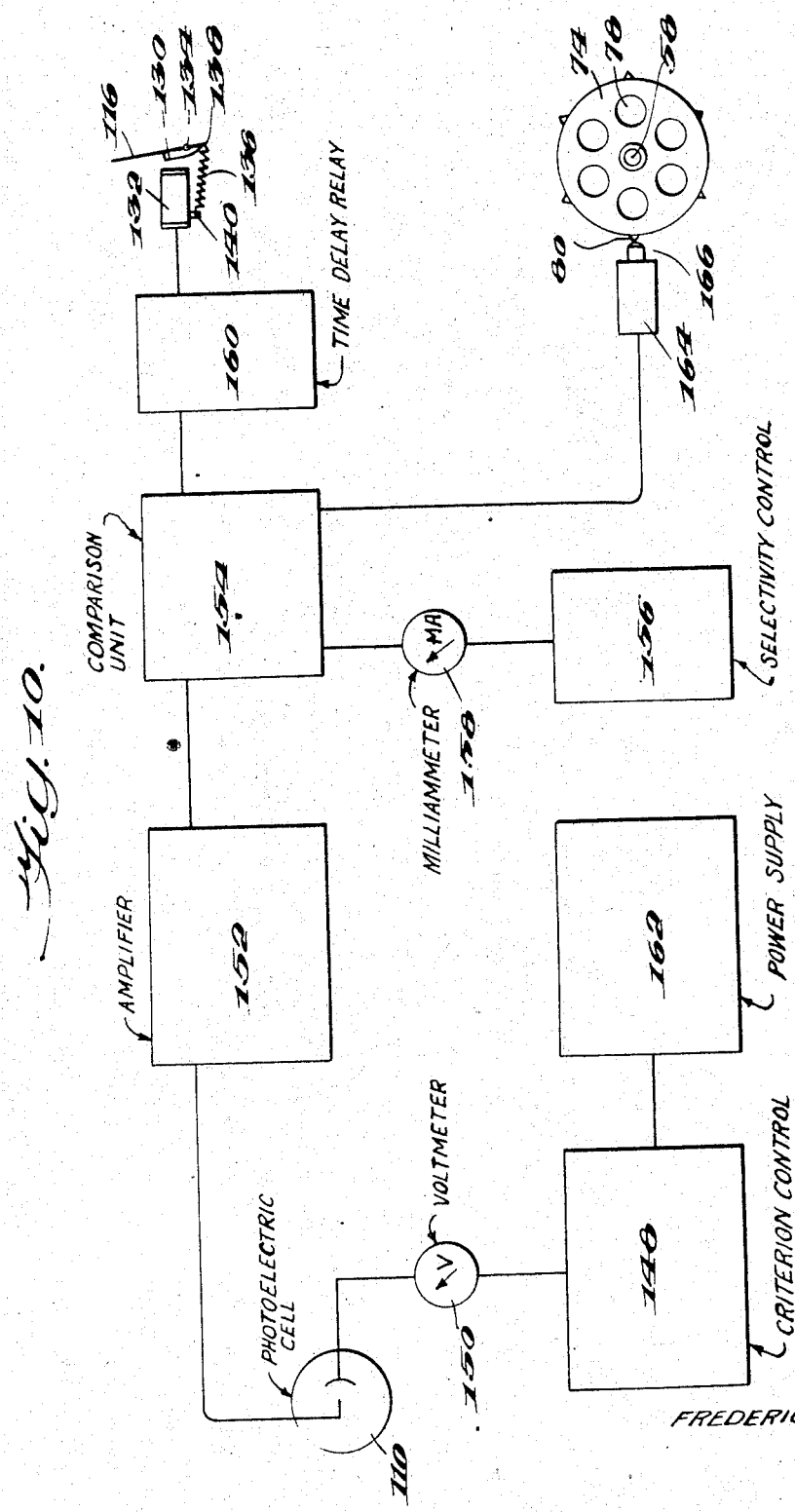
Figure 10 is a diagrammatic block plan of the control circuit.

In the drawings, the reference numeral 2 denotes a supporting frame having a base (not shown), an upwardly extending branch 6, and a laterally extending arm 8 mounting an electric motor 10. Motor 10 is provided with a power supply line (not shown) and drives, through gearing 12, a sheave 14.

Near the top of branch 6, fixed bearings 16 rotatively mount a horizontal shaft 18, upon one end of which is mounted a sheave 20 drivingly connected to sheave 14 by a friction belt 22. On the other end of shaft 18 there is mounted, as shown at 23, a tumbling barrel 24 having a closed end 26 and an open end 28. As seen best in Figs. 1 and 2, buttons are fed to barrel 24 through chute 32, which leads from a button hopper (not shown) preferably supported on the top of branch 6, chute 32 being agitated by a gear wheel 34 on shaft 18, the teeth on the gear wheel being engaged by the free end of spring strip 36 extending from chute 32.

According to well known practices, tumbling barrel 24 is provided with a circumferentially enlarged portion 38 having slots therethrough, surrounded by a band 40 affixed by bracket 41 to branch 6 and surrounding the slotted portion so that, as barrel 24 rotates, buttons are engaged in the slots and carried across the top end of a chute 44 affixed by sleeve 45 through band 40. Chute 44 is comprised of front, rear, left, and right side walls 46, 48, 50 and 52, respectively, and a slot 54 is provided in front wall 46 for inspecting and reaching buttons 55 as they slide down the chute.

Referring particularly to Figs. 1 and 3, it will be seen that a horizontal bearing 56 is mounted by piece 57 on the lower end of rear wall 48 for rotatively supporting a shaft 58 which has affixed to the front end thereof, as shown at 62, a circular scanning disk 60, the front and side walls 46 and 52 of chute 44 being cut away for accommodating the disk. Six light apertures 64 extend through disk 60 for passing light to buttons temporarily supported on the rear face of the disk by a spider 66 which comprises a hub 68 rigidly affixed to the rear face of disk 60, and six radiating arms 70 projecting between apertures 64. The rear wall 48 of chute 44 continues behind disk 60 at a distance slightly greater than the thickness of a button 55 so that, as the buttons slide down chute 44, they are lodged between a pair of arms 70 and behind an aperture 64, in which position they are carried across a path of light rays for inspection as will be later described. In order to allow light to pass rearwardly from the buttons during inspection, a slot 71, as shown in Fig. 5, which is slightly narrower than the buttons to prevent them from falling through, is provided through rear wall 48 in the path of light from the buttons. A slightly curved portion 73 is formed in left side wall 50 of chute 44 for preventing the buttons from falling laterally from the disk during inspection, and, finally, the chute is open at the bottom so that, when the buttons have been carried across the path of light for inspection, they are dropped from the then downwardly directed arms 70.

On the rear end of shaft 58 is splined a wheel 74 and held by a stop collar 76 so as to rotate with shaft 58 and disk 60. Wheel 74 is provided with six light apertures 78 registering with apertures 64 in disk 60, and with six cams 80 projecting radially outwardly from the periphery, cams 80 being circumferentially spaced from one another similarly to the spacing of apertures 64 and 78 in the disk and wheel. Suitably affixed to the front face of wheel 74 is an annular sheave 82 which together with sheave 86 on barrel 24 and friction belt 88, establishes a slip drive for rotating shaft 58, together with the elements affixed thereto. The slip drive is of particular benefit in preventing breakage of the buttons or adjacent apparatus in case the buttons jam while entering between the arms 70 of spider 66.

The remainder of the inspection assembly comprises a lamp box 90 supported by bracket 92 on frame 2 and having a lamp 94 mounted on a pivot bracket 96 so that the lamp may be swung forwardly and rearwardly for focusing on buttons 60. As shown in Figs. 1 and 3, the lamp box is provided with a circular opening 98, into which is engaged a tube 100 having a lens 102 and, preferably, a polarizing screen 104 as described in copending application Serial No. 391,592, filed May 2, 1941. As shown in the left hand portion of Figs. 1 and 3, there is a cell box 106 mounted on branch 6 by a bracket (not shown), and enclosing a photoelectric cell 110 supported on bracket 112 in the path of the light rays emanating from lamp 94 and passing through the button being inspected. Cell box 106 is also provided with a circular opening 98' supporting a tube 100', lens 102' and screen 104' as previously described.

Light 94, preferably mono-chromatic, is connected to a suitable source of electricity and controlled, along with motor 10 and the circuit described below, by a master switch 114.

The sorting assembly includes a vertically disposed chute 116, suitably mounted on frame 2 by a bracket 118 and leaving the open upper end thereof disposed immediately below the lower end of chute 44 for receiving the buttons as they are dropped from arms 70 of spider 66. The lower end of chute 116 diverges in branches 120, 122 for rejected and perfect buttons, respectively, the side wall of chute 116 being slotted, as shown by reference numeral 124 in Figs. 1 and 9 for receiving the arm 126 of a flipper plate 128, arm 126 being rigidly affixed to the armature 130 of solenoid 132, the solenoid, in turn, being supported on bracket 118.

Armature 130, which is pivoted at 134 on the outwardly extending flange 119 of the bracket 118 and is normally held away from the core of solenoid by a coil spring 136, one end of which is affixed to a lug 140 provided on the flange 119, the other end being attached to a lever arm 138 extending from the flipper 128 below pivot 134 so that flipper 128 is normally held in position to deflect buttons to the rejection branch 120. That is, the upper edge of the flipper plate is normally held slightly to the right, as seen in Fig. 1, of buttons dropping from chute 44. Secured at the lower end of chute 44, a stop 142 is attached by screw 144 for limiting the swinging movement of flipper plate 128, since the top edge of the plate need only move a distance but slightly greater than the thickness of the buttons in order to deflect them into one branch or the other.

Operation of solenoid 132 is accomplished through a control circuit shown by block diagram in Fig. 10, which is connected to the output of photoelectric cell 110. The principal electrical elements forming the circuit are contained in a box mounted on frame 2, and include a criterion control controlling the voltage across cell 110 so that the circuit may be adjusted for rejecting buttons passing less than a given amount of light. A voltmeter 150 is mounted on cell box 106 for indicating the setting. Next, an amplifier 152 is provided between cell 110 and a comparison unit 154, preferably containing a trigger tube so as to pass current over a certain value, and reject less current. The selectivity of the comparison circuit is adjustable by control 156 so as to allow the selectivity to be extremely broad or sharp, the condition being readable from a milliameter 158.

Next, between the comparison unit and solenoid 132, a time delay mechanism 160 is provided to delay the action of solenoid 132 long enough for the buttons to move from inspecting position down to just above flipper plate 116. A power supply for all circuits is provided as indicated at 162.

Ordinarily, between inspections, the control circuit remains inoperative to move flipper 116 from the position in which it rejects buttons impinging thereagainst. However, as each button reaches inspection position in front of slot 71, one of the cams 80 on wheel 74 engages the switch arm 166 of the microswitch 164. Thereafter, if the button be perfect and the eyes unblocked, sufficient light will impinge upon photoelectric cell 110 to cause energization of solenoid 132 to pull flipper 116 into position to deflect the button into chute 122 for perfect buttons. If, on the other hand, the eyes of the button be even slightly blocked or oval, cell 110 will receive insufficient light to cause actuation of the solenoid 132. An especially desirable adjunct to this structure is disclosed in copending application Serial No. 391,592, filed May 2, 1941.

While the term "buttons" has been used, the invention is also useful for inspecting other translucent elements where the specific problems outlined above are involved, the invention not being limited to the exact form shown but only by the scope of the following claims.

I claim:

1. In an apparatus for inspecting translucent molded buttons and the like, a scanning member for passing buttons across light rays, comprising a disk having at least one light aperture therethrough, axle means mounting said disk for rotation whereby to pass said aperture across said light rays, and button retaining means on said disk, comprising a pair of elements projecting from one face of said disk on opposite sides of said aperture, a guide member, said guide member being spaced from said one face of said disk by an amount slightly greater than the thickness of the button being inspected and cooperating with said disk during a portion of the downward travel of said button in said guide member, and opening means through said guide member for allowing light to pass therethrough, said opening means being of less width than the diameter of said button.

2. In an apparatus for inspecting translucent molded buttons and the like, a scanning member for passing buttons across light rays, comprising a disk having at least one light aperture therethrough, axle means mounting said disk for rotation whereby to pass said aperture across said light rays, and button retaining means on said disk, comprising a pair of elements projecting from one face of said disk on opposite sides of said aperture, a button feed chute having front and rear walls spaced from one another by a distance slightly greater than the thickness of the buttons being inspected, said front wall being cut away to accommodate at least a segment of said disk, means supporting said chute across the path of said rays, and opening means through the rear wall of said chute for allowing said light rays to pass therethrough as said light apertures in said disk pass across said opening means.

3. In an apparatus for inspecting and sorting translucent molded buttons and the like, including a sorting mechanism, a circuit for controlling said sorting mechanism, a source of light, photoresponsive means for controlling said circuit in accordance with the variations in light transmitted through buttons from said source to said photoresponsive means, a scanning mechanism for interposing buttons between said source and said means, comprising a disk having a plurality of circumferentially spaced apertures therethrough, axle means rotatively mounting said disk between said source and said photo-responsive means for passing said apertures successively across the path of light between said source and said photo-responsive means, means for supporting buttons across said apertures, respectively, current control means in said circuit means, and means rotating with said disk for actuating said current control means, successively, as said apertures pass across said path of light, said actuating member comprising a wheel affixed on said axle means for rotation with said disk, the periphery of said wheel being of greater diameter than said disk, said wheel having aperture means registering with the apertures in said disk whereby to avoid interruption of said light, said circuit control means including a switch having a switch arm, and a plurality of cam elements circumferentially spaced from one another around the periphery of said wheel in proportion with the circumferential spacing of the apertures in said disk whereby successively to engage said switch arm upon rotation of said disk and wheel.

4. In an apparatus for inspecting and sorting translucent molded buttons and the like, including a sorting mechanism, a circuit for controlling said sorting mechanism, a source of light, photoresponsive means for controlling said circuit in accordance with the variations in light transmitted through buttons from said source to said photo-responsive means, a scanning mechanism for interposing buttons between said source and said means, comprising a disk having a plurality of circumferentially spaced apertures therethrough, axle means rotatively mounting said disk between said source and said photo-responsive means for passing said apertures successively across the path of light between said source and said photo-responsive means, means for supporting buttons across said apertures, respectively, current control means in said circuit means, and means rotating with said disk for actuating said current control means, successively, as said apertures pass across said path of light, said current control means including a switch having a switch arm, said actuating means comprising a wheel affixed on said axle means for rotation with said disk, the periphery of said wheel extending radially outward of the apertures in said disk, said wheel having aperture means registering with the apertures in said disk, a plurality of cam elements on the periphery of said wheel circumferentially spaced from one another proportionally to the circumferential spacing of the apertures in said disk for successively engaging said switch arm, an annular sheave affixed on the periphery of said wheel, friction belt means drivingly engaging said annular sheave, and means for driving said friction belt means.

5. In an apparatus for inspecting and sorting translucent molded buttons and the like, including a sorting mechanism, a circuit for controlling said sorting mechanism, a source of light, photo-responsive means for controlling said circuit in accordance with the variations in light transmitted through buttons from said source to said photo-responsive means, a scanning mechanism for interposing buttons between said source and said means, comprising a disk having a plurality of circumferentially spaced apertures therethrough, axle means rotatively mounting said disk between said source and said photo-responsive means for passing said apertures successively across the path of light between said source and said photo-responsive means, means for supporting buttons across said apertures, respectively, current control means in said circuit means, and means rotating with said disk for actuating said current control means, successively, as said apertures pass across said path of light, said current control means including a switch having a switch arm, said actuating means comprising a wheel affixed on said axle means for rotation with said disk, the periphery of said wheel extending radially outward of the apertures in said disk, said wheel having aperture means registering with the apertures in said disk, a plurality of cam elements on the periphery of said wheel circumferentially spaced from one another proportionally to the circumferential spacing of the apertures in said disk for successively engaging said switch arm, an annular sheave affixed on the periphery of said wheel, friction belt means drivingly engaging said annular sheave, said annular sheave being disposed intermediate said scanning disk and said wheel, and means for driving said friction belt means.

FREDERICK H. PETERSON.